June 11, 1957

G. REZEK 2,795,759

METHODS OF AND MEANS FOR MEASURING THE DENSITY
OF PERIODIC CURRENT

Filed Nov. 7, 1951

INVENTOR
GERARD REZEK,

Stone, Boyden + Mack,

BY

ATTORNEYS

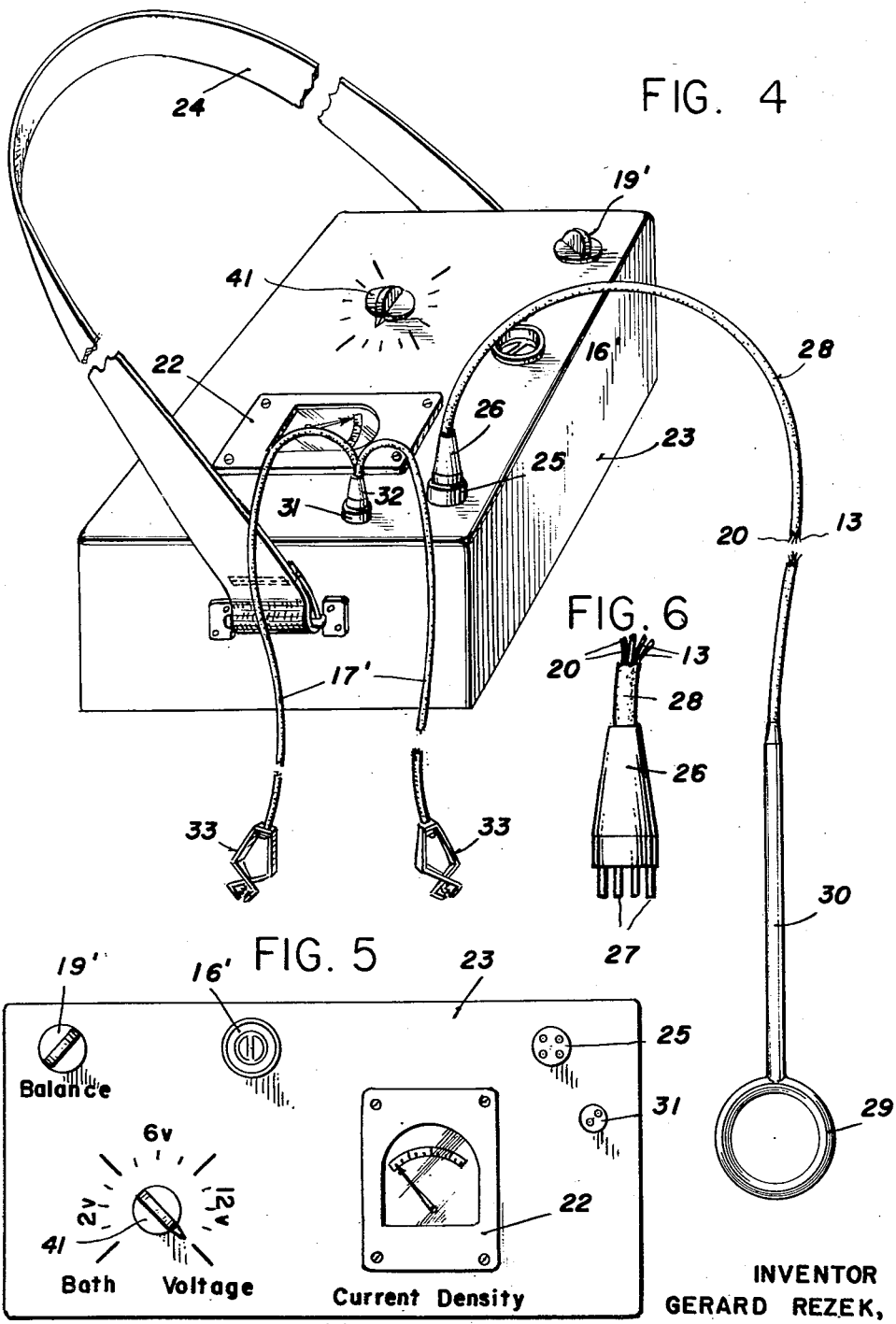

United States Patent Office 2,795,759
Patented June 11, 1957

2,795,759

METHODS OF AND MEANS FOR MEASURING THE DENSITY OF PERIODIC CURRENT

Gerard Rezek, Philadelphia, Pa., assignor to Fox Products Company, Philadelphia, Pa., a corporation of Pennsylvania Application November 7, 1951, Serial No. 255,233

4 Claims. (Cl. 324—117)

This invention relates to a method of and means for measuring the density of the current flowing through a bath of conducting liquid, and more particularly for measuring the current density at any desired point in such a bath.

The present invention is closely related to and is an improvement on that disclosed in prior application Ser. No. 252,742, filed October 23, 1951, by Godshalk, Medlar and Keck, now superseded by application Ser. No. 407,418, filed February 1, 1954.

In the present case, in order to utilize the invention, it is necessary that the current to be measured be a periodically varying one, or that at least it have a periodic or pulsating component.

The general objects of the present invention are similar to those stated in said prior application, namely, to provide a simple, portable, self contained device in the nature of a looped coil of insulated wire adapted to be immersed at any desired point in a liquid bath to at once indicate the density of current flowing through the bath.

Notwithstanding the foregoing general similarities, the two inventions operate on entirely different principles.

In said prior application, a current-responsive instrument or meter was connected with the terminals of the coil so as to measure the alternating current induced in said coil by the periodic current flowing in the bath through the area enclosed within the loop of the coil, this instrument or meter being calibrated to indicate directly by its readings the density of the curent in the bath expressed in terms of amperes per unit of cross-sectional area, as for example, per square foot.

In the present invention, on the contrary, a null method of measurement is provided. The alternating electromotive force induced in said coil by the periodic current flowing through that part of the bath enclosed within the loop of the coil, is opposed and neutralized by means of a current of the same character flowing in an auxiliary circuit. When the strength of the current flowing in this auxiliary circuit is adjusted to such a magnitude that the electromotive force in said coil is completely neutralized and reduced to zero, as shown by a suitable instrument, then the value of the current in said auxiliary circuit indicates the density of the current in the bath at the point where the coil is located.

The main object of the present invention therefore, is to provide a null method of measurement, of the nature above described, which shall be much more accurate than the direct reading method set forth in said prior three party application.

In practice, the looped coil is usually wound on a ring-like core of magnetic material, as in said prior application.

The invention may be embodied in either of two distinct modifications. In one modifications, the terminals of the coil, instead of being connected to a direct-reading meter, as in said prior application, are connected with an indicator or detector capable of accurately showing the occurrence of any induced voltage in said coil, and of indicating when such voltage is zero. In order to produce a zero indication, the pulsating flux or magneto-motive force set up in said core by the current in the bath flowing through the area thereof, is opposed and neutralized by a similar magneto-motive force acting on said core in the opposite direction, and set up by a current of the same character flowing through an auxiliary circuit comprising a conductor making one or more turns around said core. When the flux in said core is completely neutralized, so that the detector indicates zero, then the strength of the current flowing in the auxiliary circuit serves to indicate the density of the current in the bath at the point where the coil is located.

In the other modification, the electromotive force generated in the coil by the current flowing through the bath is opposed and balanced by a smiliar electromotive force generated by a transformer fed by a current of the same character flowing through an auxiliary circuit. The secondary of the transformer is connected in series opposition with the coil, and its primary is included in said auxiliary circuit. When the current in the primary is adjusted to such strength that no current flows in the closed circuit containing the coil and secondary, as shown by a suitable instrument in this circuit, then the value of the current in the auxiliary shunt circuit, as shown by a suitable meter, indicates the density of the current in the bath at the point where the coil is located.

In order that the invention may be readily understood, reference is had to the accompanying drawings, forming part of this specification, and in which:

Fig. 4 is a perspective view illustrating how the apparatus shown in the diagram of Fig. 1 may be embodied in practical form;

Fig. 5 is a plan view of the top of the cabinet shown in Fig. 4; and

Fig. 6 is a fragmentary detailed elevational view on an enlarged scale showing a fragment of one of the cables illustrated in Fig. 4.

Figure 1:
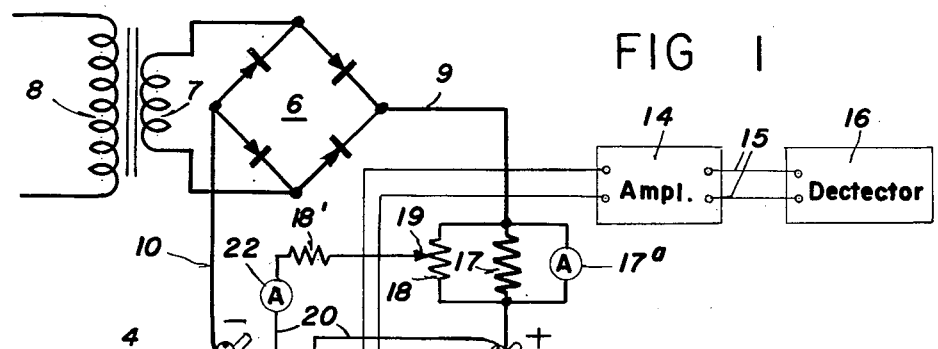
Fig. 1 is a diagram illustrating one form of the invention.

Referring to the drawings in detail and more particularly first to Fig. 1, I have illustrated a conventional plating vat 1 having anode and cathode bars 2 and 4 from which are suspended an anode plate 3 and an article 5 to be plated.

6 represents a full wave rectifier, and 7 and 8 the windings of the usual transformer for supplying current to such rectifier. The output of the rectifier is thus in the nature of a uni-directional pulsating or periodic current, and this is delivered by leads 9 and 10 to the anode and cathode bars 2 and 4, respectively.

As in the above mentioned prior application, I employ an exploring device comprising a helical coil 12 of insulated wire in the form of a loop, wound upon a ring-like core 11 of magnetic material, with the convolutions of the coil lying substantially in radial planes. While ordinary soft iron may be used for this core, much greater sensitivity can be obtained by employing one of the so-called "high quality" irons. When making a measurement, this device is immersed in the electrolyte of the bath at any desired point, preferably with the plane of the ring lying at substantial right angles to the direction of current flow.

It is not essential, however, that the coil be placed in this position. All that is necessary is that it be placed in such angular position that the current flowing in the bath passes through the opening of the coil and core. When the coil and core are placed at right angles to the direction of current flow, the entire area enclosed is the effective area used in determining the current density in the bath. If, however, the coil is so placed that its plane lies at some angle less than a right angle, to the direction of current flow, then the effective area is the projection of the actual area on a plane lying at right angles to the direction of current flow, and this projected, effective area is proportional to the cosine of the angle which the coil makes with a plane lying at right angles to the direction of current flow. Thus the effective area may be readily computed, or a meter calibrated, for any given angular position of the coil. Where, therefore, in the specification and claims, reference is made to the "area" of the coil or core, or the "area" enclosed thereby, the effective area, as above defined, is intended.

It will be understood that while I have illustrated the core 11 as in the form of a closed ring, and while it will be referred to herein as a ring, I contemplate the employment of magnetic cores of any other desired shape, such as a regular or irregular polygon or ellipse, as fully set forth in said above identified application.

The terminals of the coil 12 are connected by closed circuit comprising a pair of conductors 13 with a suitable amplifier 14 which, in turn, is connected by conductors 15 with a detector 16. This detector may be of any desired kind but is preferably of the type known as a "magic eye," which includes a vacuum tube, the character of the light from which indicates the presence or absence of impressed voltage.

In order to measure the density of the current flowing through the area enclosed by the ring, I have devised the following novel arrangement. Interposed in one of the leads 9 or 10 is a low resistance shunt 17, similar to the usual meter shunt, an ammeter 17ª being connected across it. Also connected across or bridging this shunt is a relatively high resistance potentiometer 18. An auxiliary circuit, comprising a conductor 20 connected with one end of the shunt 17 and looped through the ring 11, as indicated at 21, also includes a resistance 18', and a slide 19 working over the potentiometer 18. A suitable instrument 22 of the ammeter type is interposed in this auxiliary circuit to accurately measure the current flowing therein.

The arrows associated with the conductor 20 indicate the direction of current flow therethrough, and it will be particularly noted that the conductor 20 is looped through the ring in such a manner that the flow of current in the loop 21, as it passes through the ring, is in a direction opposite to that in which current flows through that portion of the bath within the area of the ring. It will thus be seen that by means of the shunt described, current from the same source and of exactly the same pattern as that flowing through the bath, and having a periodic component, is caused to flow through the loop 21.

If it were not for the current in this loop, the periodic current flowing in the bath through the area enclosed by the ring would generate an alternating electromotive force in the coil 12, and the detector 16 would so indicate. The current flowing through the loop 21, however, also tends to generate an alternating electromotive force in the coil 12. To put it another way, the current flowing through the bath generates a magnetomotive force in the core 11, and the current flowing through the loop 21, being in the opposite direction, generates an opposing magnetomotive force in this core. If the two currents are equal then the resulting magnetomotive force therein is zero and no electromotive force is generated in the coil 12. This condition is indicated by the detector 16.

It will therefore be understood that in measuring the current density at any point in the bath at which the core 11 and winding 12 may be immersed, the slide 19 is adjusted along the potentiometer 18 until the current flowing through the conductor 20 and loop 21 is equal to the current flowing in the bath through the area enclosed by the ring, and when this condition occurs, the detector 16 will indicate zero electromotive force. When the effect of the current through the bath is thus neutralized and balanced by the current through the loop 21, the amount of current indicated by the meter 22 will be equal to the value of the current flowing in the bath through the area enclosed by the ring, and this meter may be calibrated to read current density directly in terms of amperes per square unit of area.

I therefore achieve the novel result of being able to read from the meter 22 in an auxiliary circuit fed from the shunt, the density of the current flowing through that part of the bath in which the ring is immersed.

It will be further observed that in achieving this result I employ a null method of measurement, that is to say, the apparatus is adjusted until the detector 16 indicates zero. Then the measurement is taken from the meter 22. This null method, with a sensitive detector, is extremely accurate.

Figure 2:
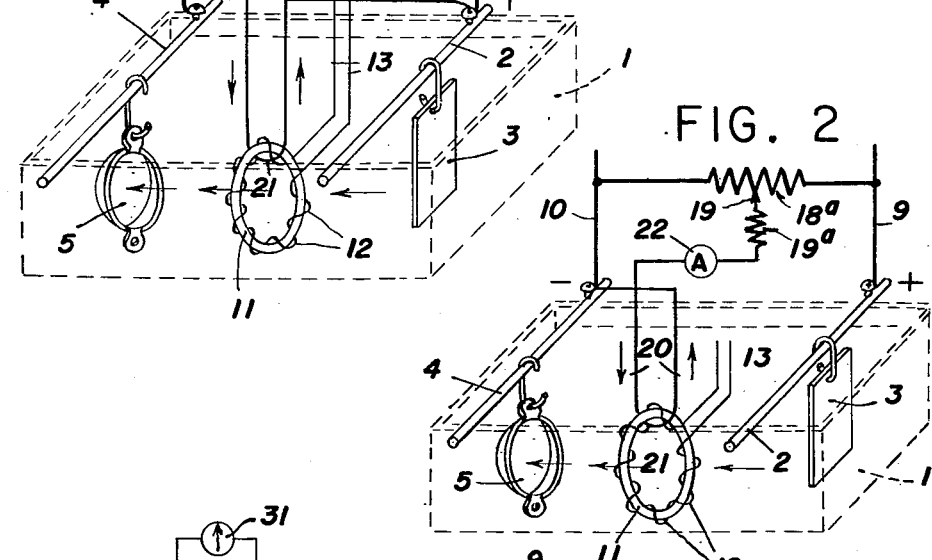
Fig. 2 is a similar diagram, with parts omitted, showing a slightly modified arrangement.

In Fig. 2 I have shown a slightly modified arrangement in which, instead of a shunt 17, in series with the bath, a suitable shunt resistance 18ª is connected, across the leads 9 and 10. The auxiliary circuit, including the conductor 20, has one end connected with the anode bar 4, and the other end connected through a resistance 19ª with the slide 19. Otherwise, the arrangement of Fig. 2 is the same as that of Fig. 1.

It may be pointed out however that the arrangement of Fig. 2 is not quite as accurate as the meter shunt arrangement of Fig. 1, due to the polarization in the bath, producing a back voltage. The magnitude of the error is in direct proportion to the magnitude of this back voltage. Where the polarization is very small the arrangement of Fig. 2 can be used satisfactorily in practice.

In Figs. 4, 5 and 6 I have illustrated one form of actual apparatus which may be conveniently employed in carrying out the method illustrated theoretically in Fig. 1.

This apparatus comprises a box or cabinet 23 provided with a strap 24 adapted to be hung around the neck of the operator. On the top panel of this box are mounted a control knob 19' for adjusting the slide 19 and regulating the amount of current in the auxiliary circuit, picked up from the potentiometer, and also the meter 22. The "magic eye" of the detector is also mounted on this panel and is indicated at 16'.

Likewise mounted on the box top or panel are receptacles 25 and 31, the former having four sockets and the latter two. Adapted to be inserted in the receptacle 25 is a plug 26 having four prongs 27, and connected with a flexible cable 28, in which are enclosed the wires 13 extending to the detector and both sides of the conductor 20 connected with the loop 21. These conductors 13 and 20 should be carefully insulated and shielded from each other.

The free end of the cable 28 passes down into and through a rigid handle 30 connected with the exploring device, designated 29 in Fig. 4. This exploring device of course includes the ring 11 and helical coil 12 to which the wires 13 are connected, as well as the loop 21 connected with the conductors 20, the whole assembly being enclosed in a protective casing of suitable acid-proof plastic material such as shown and described in the above-identified application of Godshalk, Medlar and Keck. The potentiometer 18 is mounted inside the box.

A plug 32 is adapted to fit into the receptacle 31, and from this plug extend leads 17' having at their ends suitable clips 33 for attachment to the anode and cathode bars. Thus the apparatus may be freely carried about and the exploring device immersed in the electrolyte of a plating vat at any desired point, while the leads 17' may be readily attached to the anode and cathode bars.

Preferably also mounted on the top panel of the box 23 is a range adjusting device 41 of any well-known type, this device being set to select the approximate voltage at which the bath is being operated, such, for example, as two volts, six volts or 12 volts.

Figure 3:
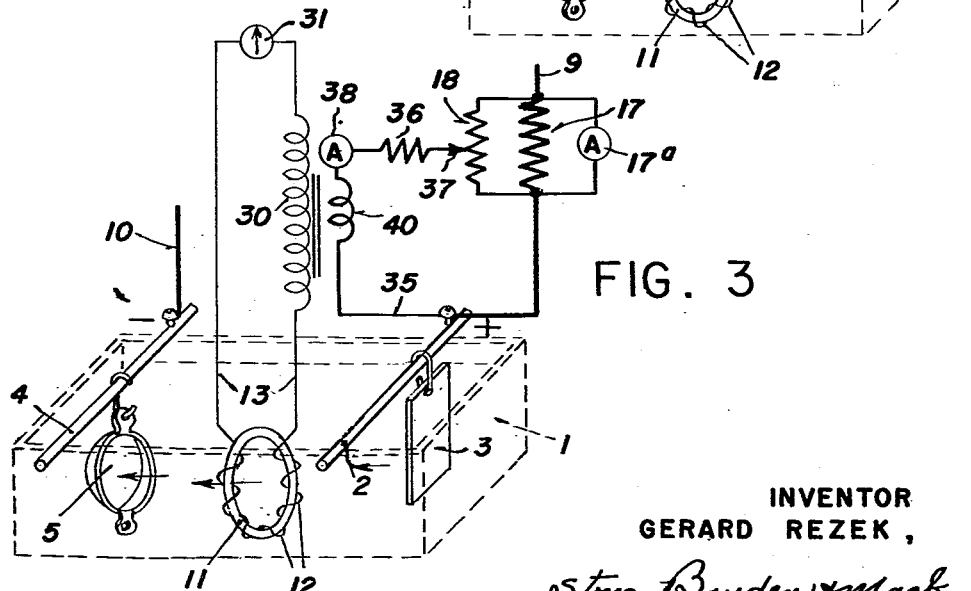
Fig. 3 is a diagram illustrating a different form of the invention.

In Fig. 3 I have shown a different form of the invention. In this form, instead of utilizing the principle of opposing magnetomotive forces in the core, I employ the principle of opposing electromotive forces in a closed circuit in which the terminals of the coil are connected. This circuit includes the secondary winding 30 of a transformer, and an indicator 31.

As in Fig. 1, there is inserted in the lead 9 a shunt resistance 17 around which is connected an ammeter 17ᵃ and a relatively high resistance potentiometer 18. The auxiliary circuit includes conductor 35, resistance 36, slide 37 working over the potentiometer 18, and a meter 38. Included in this auxiliary circuit, instead of the loop 21 of Fig. 1, is the primary winding 40 of the above-mentioned transformer.

Preferably the coil 12 and the secondary winding 30 have the same number of turns. The primary winding 40 on the other hand may have any desired number of turns, but, in practice is preferably formed with only one or two turns.

The connections are such that the voltage generated in the secondary winding 30 is in direct opposition to the voltage generated in the coil 12 which is connected in series with it. Therefore, when the two voltages are equal and opposite, no current flows in the circuit and the indicator shows a zero reading.

As in Fig. 1, the electromotive force opposing that of the coil 12 is generated by current of exactly the same character and derived from the same source as that which supplies the bath since it is generated by current in the auxiliary circuit which is connected around the shunt 17.

In operation, the slide 37 is adjusted until the instrument 31 indicates zero. When this occurs, if the primary 40 has two turns, as shown, and the secondary 30 has the same number of turns as the ring, the current through the meter 38 will be equal to one-half of the current flowing in the bath through the area enclosed by the ring. If, on the other hand, the secondary 30 has the same number of turns as the coil 12 and the primary 40 consists of only a single turn, then when the instrument 31 indicates zero the current through the meter 38 will be exactly equal to the current flowing in the bath through the area enclosed by the ring. If, with a single turn primary, the secondary has only half as many turns as the ring, the current through the meter will be double that flowing in the bath through the opening of the ring. The meter may of course be calibrated to read current density directly, as mentioned in connection with Fig. 1.

In an arrangement such as shown in Fig. 3, it is of course desirable to keep the power losses as small as possible and therefore the shunt resistance 17 should be as low as practicable. It will be understood that the voltage drop across the primary 40 approaches zero and therefore by giving to the potentiometer 18 a suitable value, the resistance 17 may be made as low as necessary.

Where in the appended claims I use the expression "ring-like core," it is intended to mean a core either in the form of a true ring or in any other form such as herein described. Moreover, the core does not necessarily have to provide a completely closed magnetic circuit, as it may contain an air gap if desired.

Furthermore, while the helical coil 12 is shown as in the form of a loop extending substantially around the circumference of the ring-like core, it does not necessarily have to be distributed around this core, but may be more or less concentrated at one point, all as explained in detail in the above-identified prior application.

While I have described the invention as designed for the measurement of the density of pulsating, unidirectional currents, such as are delivered by a full wave rectifier, it is obviously equally well adapted to the measurement of alternating currents flowing in a bath of conducting liquid, wherever and for whatever purpose such currents may be employed.

What is claimed is:

1. In combination, a bath of conducting liquid having an anode and a cathode immersed therein, a source of alternating current, a rectifier, a circuit connecting said source with said anode and cathode and including said rectifier, whereby a unidirectional current having an A.-C. and a D.-C. component flows through the bath and means for measuring the density of the current flowing through any part of said bath, said means comprising a freely and independently movable helical coil of insulated wire wound upon a ring-like core of magnetic material in such fashion that one portion of the current flows through the core and another portion flows only outside of the core and in substantially the same direction as said one portion, whereby an alternating electromotive force would normally be induced in said coil by the pulsating current flowing through that part of the bath enclosed within the area of said ring-like core and said electromotive force is substantially unaffected by said other portion of the current, an auxiliary circuit fed with current from the same source as that from which current flowing through the bath is derived but independent of said bath, said auxiliary circuit comprising a conductor surrounding said core with at least one turn, the connections being such that current flowing in said auxiliary circuit passes through the opening of said ring-like core in a direction opposite to that in which current in the bath flows through said opening, said A.-C. and D.-C. components having a known proportionality means for adjusting the value of the current flowing in said auxiliary circuit, whereby, when the magnetomotive forces generated by said two currents balance each other, the flux in said core is eliminated, a current measuring device in said auxiliary circuit, and means connected with the terminals of said coil for indicating when the electromotive force induced therein approaches zero.

2. In combination, a bath of conducting liquid having an anode and a cathode immersed therein, a source of alternating current, a rectifier, a first circuit connecting said source with said anode and cathode and including said rectifier, whereby a unidirectional current having an A.-C. and a D.-C. component flows through the bath, said A.-C. and D.-C. components having a known proportionality, and means for measuring the density of the current flowing through any part of said bath, said means comprising a freely and independently movable core of magnetic material forming a loop and immersed in the bath in such fashion that one portion of said current flows through said core and another portion flows only outside the core and in substantially the same direction as said one portion of the current, a coil of insulated wire on said core, whereby a first magnetomotive force tending to set up a flux which would induce an electromotive force in the coil is generated in the core by said one portion of the current, a closed circuit connected with the terminals of said coil, means in said closed circuit for indicating the presence of current therein, an auxiliary circuit including a conductor surrounding said core with at least one turn and connected with said first-mentioned circuit in such manner as to derive current therefrom and pass that current through the conductor, the direction of current flow in said conductor and the direction of winding of the conductor on the core being such as to generate a second magnetomotive force in the core opposed to the first magnetomotive force, and a current measuring instrument in said auxiliary circuit, whereby the magnitude of current indicated by said instrument when said indicating means indicates zero current flow in said closed circuit is a measure of the D.-C. component of said one portion of the current.

3. In combination, a bath of conducting liquid having an anode and a cathode immersed therein, a source of alternating current, a rectifier, a circuit connecting said source with said anode and cathode and including said rectifier, whereby a unidirectional current having an A.-C. and a D.-C. component flows through the bath, said A.-C. and D.-C. components having a known proportionality, and means for measuring the density of the current flowing through any part of said bath, said means comprising a freely and independently movable helical coil of insulated wire wound upon a ring-like core of magnetic material immersed in the bath in such fashion that one portion of said current flows through said core and another portion flows only outside the core and in substantially the same direction as said one portion of the current, whereby a first magnetomotive force tending to set up a flux which would induce an electromotive force in the coil is generated in the core by said one portion of the current, a meter shunt in said first-mentioned circuit, an auxiliary circuit connected around said shunt and comprising a conductor surrounding said core with at least one turn, the direction of current flow in the conductor and the direction of winding of the conductor on the core being such as to generate a second magnetomotive force in the core opposed to the first magnetmotive force, means for adjusting the portion of the voltage across the meter shunt developed across said conductor to vary the current flowing in the conductor, a current measuring instrument in said auxiliary circuit for measuring the current flowing through the conductor, and an indicating device connected with the terminals of said coil to indicate the voltage thereacross whereby the indication of said current measuring instrument is a measure of the D.-C. component of said one portion of the current in the bath when the indicating device indicates zero voltage across the coil.

4. The apparatus of claim 3 in which said adjusting means comprises a potentiometer connected across the series combination of said current measuring instrument and said conductor.

References Cited in the file of this patent

UNITED STATES PATENTS

| | | |
|---|---|---|
| 1,825,514 | Fitzgerald | Sept. 29, 1931 |
| 2,542,057 | Relis | Feb. 20, 1951 |

FOREIGN PATENTS

| | | |
|---|---|---|
| 726,579 | France | Nov. 20, 1931 |